United States Patent
Palacios Laloy et al.

(10) Patent No.: US 10,690,501 B2
(45) Date of Patent: Jun. 23, 2020

(54) DEVICE FOR MEASURING ROTATION, ASSOCIATED METHOD AND INERTIAL NAVIGATION UNIT

(71) Applicants: COMMISSARIAT À L'ÉNERGIE ATOMIQUE ET AUX ÉNERGIES ALTERNATIVES, Paris (FR); SAFRAN, Paris (FR)

(72) Inventors: Augustin Palacios Laloy, Saint Egreve (FR); Etienne Brunstein, Argenteuil (FR); Marc Gramlich, Taverny (FR); Sophie Morales, Varces (FR)

(73) Assignees: COMMISSARIAT À L'ÉNERGIE ATOMIQUE ET AUX ÉNERGIES ALTERNATIVES, Paris (FR); SAFRAN, Paris (FR)

( * ) Notice: Subject to any disclaimer, the term of this patent is extended or adjusted under 35 U.S.C. 154(b) by 129 days.

(21) Appl. No.: 16/089,688

(22) PCT Filed: Mar. 28, 2017

(86) PCT No.: PCT/EP2017/057254
§ 371 (c)(1),
(2) Date: Sep. 28, 2018

(87) PCT Pub. No.: WO2017/167717
PCT Pub. Date: Oct. 5, 2017

(65) Prior Publication Data
US 2019/0107395 A1 Apr. 11, 2019

(30) Foreign Application Priority Data
Mar. 31, 2016 (FR) ...................... 16 52833

(51) Int. Cl.
*G01C 19/60* (2006.01)
*G01C 19/5776* (2012.01)

(52) U.S. Cl.
CPC ......... *G01C 19/60* (2013.01); *G01C 19/5776* (2013.01)

(58) Field of Classification Search
CPC ............................ G01C 19/60; G01C 19/5776
(Continued)

(56) References Cited

U.S. PATENT DOCUMENTS 10,401,177 B2 * 9/2019 Morales ................. G01C 21/18
2016/0084925 A1 3/2016 Le Prado et al.
(Continued)

FOREIGN PATENT DOCUMENTS

EP 1865283 A1 12/2007
EP 2629053 A2 8/2013

OTHER PUBLICATIONS

Shkel, "The Chip-Scale Combinatorial Atomic Navigator", GPS World (Year: 2013).*
(Continued)

*Primary Examiner* — Nathaniel T Woodward
(74) *Attorney, Agent, or Firm* — Pearne & Gordon LLP

(57) ABSTRACT

A device for measuring rotation including an NMR gyroscope having a sensing axis, a computer, a generating member configured to generate a magnetic field directed along the sensing axis, and a MEMS gyroscope rigidly connected to the NMR gyroscope, the MEMS gyroscope having a sensing axis aligned with the sensing axis of the NMR gyroscope, the MEMS gyroscope being suitable for delivering a MEMS signal representing a rotation about the sensing axis, the computer being configured to calculate, from an NMR signal output by the NMR gyroscope, information relating to a rotation about the sensing axis, and to analyse the MEMS signal over time in order to determine a current cut-off frequency, the computer also being configured to control the generating member in order to generate, (Continued)

over time, a magnetic field of which the amplitude is a function of the current cut-off frequency.

10 Claims, 2 Drawing Sheets

(58) Field of Classification Search
USPC .................................................. 73/504, 12
See application file for complete search history.

(56) References Cited

U.S. PATENT DOCUMENTS

2017/0010337 A1  1/2017  Morales et al.
2018/0164102 A1  6/2018  Morales et al.

OTHER PUBLICATIONS

Andrei Shkel, "The Chip-Scale Combinatorial Atomic Navigator", GPS World, Aug. 1, 2013.
International Search Report for International Application No. PCT/EP2017/057254, dated Apr. 20, 2017.
Written Opinion for International Application No. PCT/EP2017/057254, dated Apr. 20, 2017.
Preliminary French Search Report for Application No. 16 52833, dated Nov. 16, 2016.
Yolanda Murphy, "Northrop Grumman Awarded Contract to Develop Miniaturized Inertial Navigation System for DARPA", Northrop Grumman Corporation, Jun. 5, 2014.
U.S. Appl. No. 16/015,691; entitled "Method for Detecting Rotation with Rapid Start-up of an Atomic Gryoscope with SEOP", filed Jun. 22, 2018.

\* cited by examiner ns the U.S. Pat. No. 4,157,495A. This
DEVICE FOR MEASURING ROTATION, ASSOCIATED METHOD AND INERTIAL NAVIGATION UNIT

CROSS-REFERENCE TO RELATED APPLICATIONS

This is a National Stage application of PCT international application PCT/EP2017/057254, filed on Mar. 28, 2017, which claims the priority of French Patent Application No. 16 52833, filed Mar. 31, 2016, both of which are incorporated herein by reference in their entirety.

TECHNICAL FIELD

The present invention relates to a device for measuring rotation including an NMR gyroscope having a predetermined sensitive axis and a computer, the NMR gyroscope further comprising a generation member configured to generate a magnetic field directed along the sensitive axis, the computer being configured to compute, on the basis of an NMR signal output by the NMR gyroscope, a data item relating to a rotation about the sensitive axis.

The invention also relates to an inertial navigation unit, a method for measuring rotation and a computer program product.

The invention applies to the field of atomic spin gyroscopes (ASG), in particular to the field of nuclear magnetic resonance gyroscopes, also known as "NMR gyroscopes". The invention applies, for example, to the field of inertial navigation using gyroscopes, particularly using NMR gyroscopes.

STATE OF THE RELATED ART

It is known to use an NMR gyroscope for measuring a rotation about an axis, also known as a "sensitive axis", of a travelling object (typically a vehicle) associated with the NMR gyroscope with respect to an inertial reference frame.

Conventionally, an NMR gyroscope includes a cell comprising a detection gas. Such a detection gas includes at least one chemical species having a nuclear spin different to zero. For example, the detection gas may include a mixture of xenon 129 and xenon 131.

In operation, the nuclear spins of the different atoms of the detection gas are firstly oriented along a predetermined direction. Furthermore, a static magnetic field, directed along the sensitive axis, is applied to the detection gas in the cell. A set of oscillating magnetic fields (as numerous as the sensitive species of the detection gas) are also applied to the detection gas. Each of these magnetic fields oscillates successively over time at a frequency increasingly close to the natural oscillation frequency of the corresponding sensitive species of the detection gas, according to the NMR self-oscillator principle, well known in the field and implemented in particular in the U.S. Pat. No. 4,157,495A. This has the effect of inducing a precession, about the sensitive axis, of the nuclear spins of each of the chemical species having a spin different to zero present in the detection gas.

Conventionally, the precession frequency measurement leads to a measurement of the rotational speed about the sensitive axis of a reference frame associated with the gyroscope with respect to an inertial reference frame, according to the formula:

$$\omega = \omega_L \pm \omega_R \quad (1)$$

where $\omega$ is the precession frequency of the spins, measured in the reference frame associated with the gyroscope, $\omega_L$ is a frequency referred to as the "Larmor frequency", merely dependent on the amplitude of the static magnetic field and on an intrinsic quantity specific to each of the species having nuclear spins different to zero present in the detection gas, said quantity being referred to as the "gyromagnetic ratio", $\omega_R$ is the rotational frequency of the gyroscope projected on the sensitive axis, the sign being dependent on the direction of rotation of the gyroscope with respect to the direction of precession of the spins about the sensitive axis.

Such NMR gyroscopes are suitable for being incorporated in devices for measuring rotation intended to be used in the context of inertial navigation.

However, such a use requires that predetermined criteria be met.

In so-called strapdown mode, i.e. when the gyroscope is rigidly connected to a carrier (such as a land, sea, submarine, air or space vehicle), directly or by means of a suspension member, such criteria are, for example, a drift less than or equal to 0.01°/h (degrees per hour) and an angle random walk (or ARW) less than or equal to 0.002°/√h (degrees per square root hour).

The provision of reliable measurements by the device for measuring rotation requires that the detection bandwidth of the NMR gyroscope be sufficiently large with respect to the spectral range of the rotation phenomena of the carrier about the sensitive axis. In particular, in the case of vibratory phenomena, this spectral range is liable to attain several hundred Hertz, according to the behaviour of the suspension members whereby the inertial unit is rigidly connected to the carrier.

This requirement relating to the bandwidth particularly has the aim of limiting spectral folding problems which arise in the case of the NMR gyroscope. Indeed, the phenomenon detected by the NMR gyroscope, i.e. spin precession, is modulated by the vibrations of the carrier, the bandwidth whereof is of the order to a few hundred Hertz, for example around 300 Hz. As such, due to this modulation, it is possible for the rotation signal detected by the NMR gyroscope to be incorrect, particularly if the spectral range of the rotation phenomena is greater than the detection bandwidth of the gyroscope.

Making reliable frequency measurements therefore requires a high bandwidth.

However, in NMR gyroscopes, the bandwidth is proportional to the amplitude of the static magnetic field. As such, to prevent spectral folding problems and thereby make reliable frequency measurements, regardless of the frequency of the vibrations of the carrier, it is known to apply a static magnetic field having a high amplitude, for example of the order of 1000 µT (microtesla), in order to obtain a large bandwidth.

Nevertheless, measuring devices including such NMR gyroscopes are not entirely satisfactory.

Indeed, such gyroscopes are oversized, which is generally expressed by increased electrical consumption and spatial requirements.

Moreover, the increase in the value of the magnetic field generally gives rise to an increase in the modulus of the magnetic field gradient within the NMR gyroscope cell. This generally leads to a degradation of the value of the ARW parameter of the gyroscope and impairs the reliability of the measurement in the context of inertial navigation.

An aim of the invention is therefore that of providing a device for measuring rotation by means of an NMR gyroscope, which is reliable while being less bulky and less costly than standard measuring devices.

DESCRIPTION OF THE INVENTION

To this end, the invention relates to a device for measuring rotation including an NMR gyroscope having a predetermined sensitive axis and a computer, the NMR gyroscope further comprising a generation member configured to generate a magnetic field directed along the sensitive axis, the computer being configured to compute, on the basis of an NMR signal output by the NMR gyroscope, a data item relating to a rotation about the sensitive axis, the measuring device being characterised in that it further comprises a MEMS gyroscope rigidly connected to the NMR gyroscope, the MEMS gyroscope having a sensitive axis merged with the sensitive axis of the NMR gyroscope, and suitable for outputting a MEMS signal representative of a rotation about the sensitive axis, the computer being also configured to analyse, over time, the MEMS signal to determine a present cutoff frequency, the computer being further configured to control the generation member so as to generate, over time, a magnetic field wherein the amplitude is dependent on the present cutoff frequency determined by the computer.

Indeed, MEMS gyroscopes conventionally exhibit a high bandwidth with respect to NMR gyroscopes, and therefore a shorter response time than NMR gyroscopes. Using a MEMS gyroscope allows rapid measurement of the cutoff frequency, associated in particular with the vibrations of the carrier, hence a rapid adjustment of the amplitude of the static magnetic field in the cell, and therefore a rapid adjustment of the bandwidth of the NMR gyroscope.

The choice, at the level of the NMR gyroscope, of a bandwidth determined in this way reduces problems associated with spectral folding. Furthermore, this leads to a reduction in the degradation of the ARW parameter accompanying the use of high-amplitude magnetic fields.

Such a measuring device therefore allows a dynamic adjustment of the operation of the NMR gyroscope so as to operate in a mode associated with an optimal compromise between the ARW parameter and bandwidth, at any time in the mission.

Moreover, MEMS gyroscopes are generally of reduced size and relatively inexpensive. Such a measuring device is therefore less bulky and less costly to produce than standard measuring devices.

According to further advantageous aspects of the invention, the device includes one or a plurality of the following features, taken in isolation or according to the technical possible combinations:

the NMR gyroscope includes a cell including a single gas having a nuclear spin different to zero, the gas having a gyromagnetic ratio, the generation member being configured to generate, over time, a magnetic field wherein the amplitude is greater than or equal to the result of the division of the cutoff frequency by the gyromagnetic ratio of the gas;

the NMR gyroscope includes a cell comprising N gases each having a nuclear spin different to zero, N being a natural integer strictly greater than 1, each gas having a specific gyromagnetic ratio, the absolute values of the gyromagnetic ratios being distinct in pairs, the generation member being configured to generate, over time, a magnetic field wherein the amplitude is greater than or equal to the division of the cutoff frequency by the smallest of the absolute values of the gyromagnetic ratios, and the result of each division of double the cutoff frequency by each of the differences between the absolute value of a gyromagnetic ratio and the absolute value of a gyromagnetic ratio which is immediately lower;

the cell comprises a first gas and a second gas, the first gas being xenon 131 and the second gas being xenon 129;

the computer is configured to detect a present stage among a start-up stage and a navigation stage, the computer being further configured to control, in the case where the present stage is a start-up stage, the generation member so as to generate a magnetic field having a predetermined set-point amplitude;

the computer is configured to compute, over time, the spectrum of the MEMS signal, and to assign to the present cutoff frequency the frequency value from which the amplitude of the present spectrum of the MEMS signal is less than or equal to a predetermined threshold.

The invention further relates to a method for measuring rotation including the computing of a data item relating to a rotation about a predetermined sensitive axis, on the basis of an NMR signal output by an NMR gyroscope having the predetermined sensitive axis and comprising a generation member configured to generate a magnetic field directed along the sensitive axis, the method being characterised in that it further includes steps for:

analysing, over time, a MEMS signal emitted by a MEMS gyroscope rigidly connected to the NMR gyroscope and having a sensitive axis merged with the sensitive axis of the NMR gyroscope, the MEMS signal being representative of a rotation about the sensitive axis, to determine a present cutoff frequency;

commanding the generation member of the NMR gyroscope to generate, over time, a magnetic field wherein the amplitude is dependent on the present cutoff frequency.

According to a further advantageous aspect of the invention, the method further includes steps for:

detecting a present stage among a start-up stage and a navigation stage;

in the case where the present stage is a start-up stage, commanding the generation member to generate a magnetic field having a predetermined set-point amplitude.

The invention further relates to a computer program product comprising program code instructions which, when run by a computer, implement the method as defined above.

The invention further relates to an inertial navigation unit characterised in that it includes a first and a second measuring device as defined above, the first and the second measuring device having non-parallel sensitive axes.

According to a further advantageous aspect of the invention, the inertial navigation unit includes a third measuring device as defined above, the third measuring device having a sensitive axis non-parallel to each of the sensitive axes of the first and the second measuring device.

BRIEF DESCRIPTION OF THE FIGURES

The invention will be understood more clearly with the aid of the following description, given merely by way of non-limiting example and with reference to the appended figures wherein.

DETAILED DESCRIPTION OF PARTICULAR EMBODIMENTS

Figure 1:
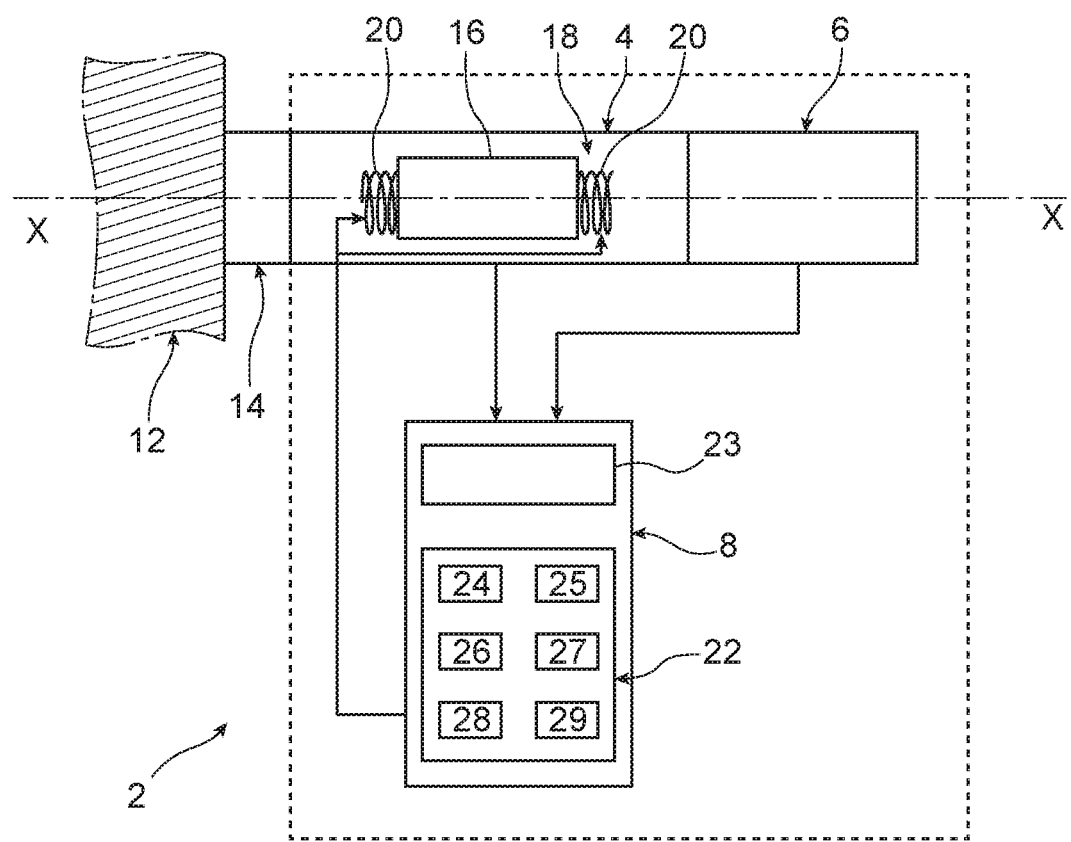
FIG. 1 is a schematic representation of a device for measuring rotation according to the invention.

A device 2 for measuring rotation according to the invention is represented in FIG. 1.

The measuring device 2 includes an NMR gyroscope 4, a MEMS gyroscope 6 and a computer 8.

The NMR gyroscope 4 is rigidly connected to a carrier 12. For example, the NMR gyroscope 4 is attached to the carrier 12 by means of a suspension member 14.

The NMR gyroscope 4 is suitable for measuring a rotation about a predetermined axis X-X associated with the NMR gyroscope 4, the predetermined axis also being known as the "sensitive axis".

The NMR gyroscope 4 comprises a cell 16 and a magnetic field generation member 18.

The cell 16 is, preferably, a hermetic cell. The cell 16 comprises at least one gas having a nuclear spin different to zero. Each gas of nuclear spin different to zero has a specific gyromagnetic ratio, annotated γ.

In the case where the cell 16 comprises a first gas and a second gas, the first gas has a first gyromagnetic ratio $\gamma_1$, and the second gas has a second gyromagnetic ratio $\gamma_2$ the absolute value whereof is different to the absolute value of the first gyromagnetic ratio γ.

For example, the first gas is xenon 129, having a gyromagnetic ratio $\gamma_1$ equal to −10.86 Hz/µT (hertz per microtesla). For example, the second gas is xenon 131, having a gyromagnetic ratio $\gamma_2$ equal to 3.52 Hz/µT.

The generation member 18 is configured to generate a magnetic field directed along the sensitive axis X-X.

For example, the generation member 18 includes turns 20 wherein the axis is the sensitive axis X-X, and suitable for enabling the flow of an electric current.

The MEMS gyroscope 6 (acronym of "microelectromechanical systems") is a conventionally known microelectromechanical system gyroscope.

The MEMS gyroscope is rigidly connected to the NMR gyroscope 4.

The MEMS gyroscope 6 has a sensitive axis merged with the sensitive axis X-X of the NMR gyroscope 4.

The MEMS gyroscope 6 is suitable for outputting a MEMS signal representative of a rotation of the carrier 12 about the sensitive axis X-X. In particular, the MEMS gyroscope 6 is suitable for outputting a MEMS signal representative of the mechanical vibrations of the carrier 12 about the sensitive axis X-X, in an orthogonal plane to the sensitive axis X-X.

The computer 8 is connected to the MEMS gyroscope 6 to receive the MEMS signal. The computer 8 is also connected to the NMR gyroscope 4 to receive an NMR signal representative of the rotations of the carrier 12 about the sensitive axis X-X.

The computer 8 includes a memory 22 and a processor 23.

The memory 22 is configured to store analysis software 24, computing software 25, control software 26 and synthesis software 27.

Advantageously, the memory 22 is also configured to store detection software 28.

The memory 22 further comprises a memory slot 29.

The analysis software 24 is configured to analyse, over time, the MEMS signal. In particular, the analysis software 24 is configured to analyse the MEMS signal over time so as to determine a cutoff frequency W representative of a threshold beyond which the vibrations of the carrier 12 are considered to be negligible. For example, the analysis software 24 is configured to compute the spectrum of the MEMS signal over time and to assign to the cutoff frequency the frequency value from which the amplitude of the spectrum of the MEMS signal is less than or equal to a predetermined threshold.

The computing software 25 is configured to compute over time, and on the basis of the present cutoff frequency W, a set-point amplitude B for the static m currentfield applied to the cell 16 of the NMR gyroscope 4.

In particular, if the cell 16 of the NMR gyroscope 4 comprises a single gas having a nuclear spin different to zero and gyromagnetic ratio γ, the computing software 25 is configured to computer, over time, a set-point amplitude B which is greater than or equal to the result of the division of the cutoff frequency W by the absolute value |γ| of the gyromagnetic ratio of the gas γ:

$$B \geq \frac{W}{|\gamma|}$$

where || is the "absolute value" operator.

For example, at a given time, the present set-point amplitude B is equal to the result of the division of the present cutoff frequency W by the absolute value |γ| of the gyromagnetic ratio of the gas γ, multiplied by a factor strictly greater than one.

Furthermore, if the cell 16 of the NMR gyroscope 4 comprises a first gas having a first gyromagnetic ratio $\gamma_1$, and a second gas having a second gyromagnetic ratio $\gamma_2$, the absolute value $|\gamma_2|$ of the second gyromagnetic ratio $\gamma_2$ being greater than the absolute value $|\gamma_1|$ of the first gyromagnetic ratio $\gamma_1$, the computing software 25 is configured to compute, over time, a set-point amplitude B which is greater than or equal to the maximum between the result of the division of the cutoff frequency W by the absolute value $|\gamma_1|$ of the first gyromagnetic ratio $\gamma_1$, and the result of the division of double the cutoff frequency by the difference $|\gamma_2|-|\gamma_1|$ between the absolute value $|\gamma_2|$ of the second gyromagnetic ratio $\gamma_2$ and the absolute value $|\gamma_1|$ of the first gyromagnetic ratio $\gamma_1$:

$$B \geq \max\left(\frac{W}{|\gamma_1|}, \frac{2W}{|\gamma_2|-|\gamma_1|}\right) \quad (2)$$

where "max" is the maximum operator.

For example, at a given time, the present set-point amplitude B is equal to the maximum expressed in the relation (2), multiplied by a factor strictly greater than one.

For example, with a cutoff frequency equal to 300 Hz, and a cell 16 comprising xenon 129 and xenon 131, the computing software 25 computes a set-point amplitude B which is greater than or equal to 85 µT, for example a set-point amplitude B equal to 100 µT.

As a general rule, if the cell 16 of the NMR gyroscope 4 comprises N gases having a nuclear spin different to zero, N being a natural integer strictly greater than 1, the absolute values of the gyromagnetic ratios thereof being distinct in pairs and being sequenced in increasing order from $|\gamma_1|$ (lowest value), $|\gamma_2|, \ldots, |\gamma_i|, \ldots,$ to $|\gamma_N|$ (highest value), the computing software 25 is configured to compute, over time, a set-point amplitude B which is greater than or equal to the maximum between the result of the division of the cutoff frequency W by the absolute value $|\gamma_1|$ of the first gyromagnetic ratio $\gamma_1$, and the result of each division of double the cutoff frequency W by each of the differences between the absolute value of a gyromagnetic ratio $\gamma_2, \ldots, \gamma_i, \ldots, \gamma_N$ and the absolute value of a gyromagnetic ratio $\gamma_1, \gamma_2, \ldots, \gamma_{i-1}, \ldots, \gamma_{N-1}$ which is immediately lower:

$$B \geq \max\left(\frac{W}{|\gamma_1|}, \frac{2W}{|\gamma_2| - |\gamma_1|}, \ldots, \frac{2W}{|\gamma_i| - |\gamma_{i-1}|}, \ldots, \frac{2W}{|\gamma_N| - |\gamma_{N-1}|}\right) \quad (3)$$

For example, at a given time, the present set-point amplitude B is equal to the maximum expressed in the relation (3), multiplied by a factor strictly greater than one.

By way of example, for three noble gases, the set-point amplitude verifies the following relation:

$$B \geq \max\left(\frac{W}{|\gamma_1|}, \frac{2W}{|\gamma_2| - |\gamma_1|}, \frac{2W}{|\gamma_3| - |\gamma_2|}\right) \quad (4)$$

In this case, at a given time, the present set-point amplitude B is equal to the maximum expressed in the relation (4), multiplied by a factor strictly greater than one.

The control software 26 is configured to control the generation member 18 so as to generate, over time, a magnetic field wherein the amplitude is equal to the present set-point amplitude B computed by the computing software 25.

The synthesis software 27 is configured to compute, on the basis of the NMR signal output by the NMR gyroscope 4, a rotation of the carrier 12 about the sensitive axis X-X, in a predetermined inertial reference frame.

The detection software 28 is configured to detect a present stage wherein is found the measuring device 2 and/or the carrier 12, among a start-up stage and a navigation stage.

For example, the start-up stage corresponds to the start-up of an inertial unit equipped with the measuring device 2, as well as the carrier 12. The start-up stage corresponds, for example, to an alignment stage consisting of a geographic North search, based on the detection of the rotation of the Earth.

For example, the navigation stage corresponds to a period of movement of the carrier 12.

The control software 26 is advantageously configured to, in the case where the detection software 28 detects that the present stage is the start-up stage, control the generation member 18 so as to generate a magnetic field having an amplitude equal to a predetermined set-point amplitude.

Preferably, the memory slot 29 is configured to store the value of the gyromagnetic ratio of each of the species having a nuclear spin different to zero present in the cell 16. The memory slot 29 is also configured to store the predetermined set-point amplitude.

The processor 23 is configured to run each among the analysis software 24, computing software 25, control software 26, synthesis software 27 and the detection software 28 stored in the memory 22 of the computer 8.

Alternatively, the MEMS gyroscope 6 is rigidly connected to the carrier 12 by means of a suspension member such that the vibrations sustained by the NMR gyroscope 4 and the MEMS gyroscope 6 are the same. For example, the MEMS gyroscope 6 is rigidly connected to the carrier 12 by means of a suspension member identical to the suspension member 14 by means whereof the NMR gyroscope 4 is rigidly connected to the carrier 12. In this case, the NMR gyroscope 4 and the MEMS gyroscope 6 are also said to be rigidly interconnected.

Figure 2:
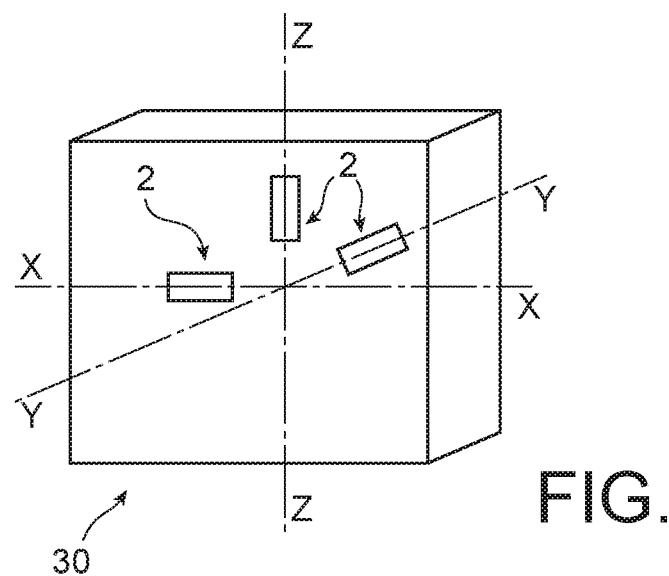
FIG. 2 is a schematic representation of an inertial unit according to the invention.

An inertial navigation unit 30 according to the invention is illustrated in FIG. 2.

The inertial navigation unit 30 includes at least two measuring devices 2 according to the invention. For example, the inertial navigation unit 30 includes three measuring devices 2, respectively including a sensitive axis X-X, Y-Y and Z-Z. Advantageously, the sensitive axes X-X, Y-Y and Z-Z of each of the measuring devices 2 are non-parallel in pairs.

Advantageously, the measuring devices 2 of the inertial navigation unit 30 share the same computer 8.

Figure 3:
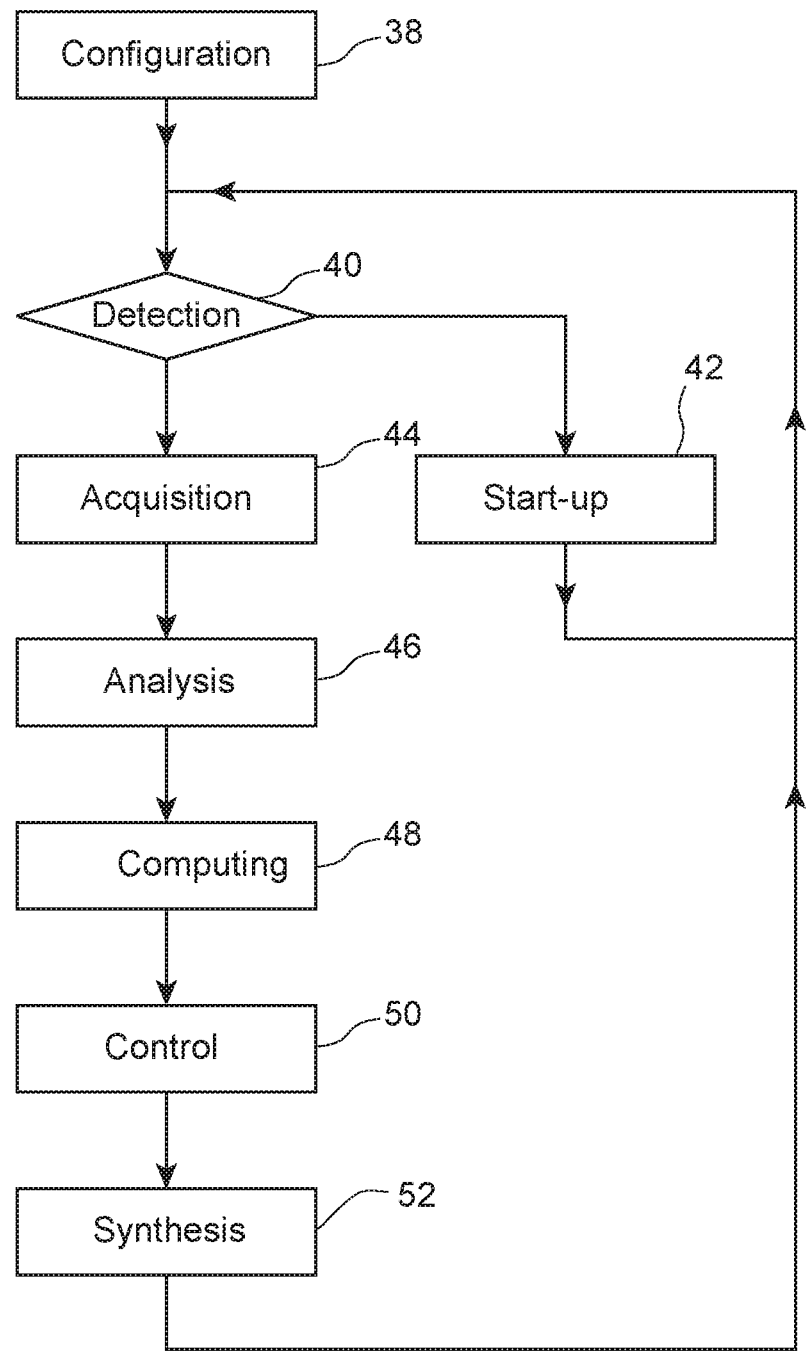
FIG. 3 is a functional flow chart of the inertial unit in FIG. 2.

The operation of the inertial navigation unit 30 will now be described with reference to FIG. 3.

In operation, during a configuration step 38, for each measuring device 2, an operator records, in the memory slot 29 of the memory 22, the value of the gyromagnetic ratio of each of the species having a nuclear spin different to zero present in the cell 16. Advantageously, the operator also records, in the memory slot 29, the predetermined set-point amplitude.

Then, during a detection step 40, and for each measuring device 2 of the inertial navigation unit 30, the detection software 28 detects the stage wherein the inertial navigation unit 30 is found, among the start-up stage and the navigation stage.

If the present stage is the start-up stage, then, during a subsequent start-up step 42, the control software 26 commands the generation member 18 to generate a magnetic field having an amplitude equal to the predetermined set-point amplitude.

Preferably, the start-up step 42 is followed by the detection step 40.

If the present stage is the navigation stage, then, during a subsequent acquisition step 44, the computer 8 receives, from the MEMS gyroscope, the MEMS signal.

Then, during an analysis step 46, the analysis software 24 analyses the MEMS signal and determines the present cutoff frequency W.

Then, during a computing step 48, the computing software 25 computes the present set-point amplitude B.

Then, during a control step 50, the control software 26 commands the generation device 18 to generate, in the cell 16 of the NMR gyroscope 4, a magnetic field wherein the amplitude is equal to the present set-point amplitude B computed during the computing step 48.

Then, during a synthesis step 52, the synthesis software 27 determines, on the basis of the NMR signal output by each NMR gyroscope, a rotation of the carrier 12 about the corresponding sensitive axis X-X, Y-Y, Z-Z, in the predetermined inertial reference frame.

Then, while the present stage is the navigation stage, the synthesis step 52 is followed by the acquisition step 44.

The detection of the fact that the present stage is the start-up stage leads to a quick start-up of the measuring device. Indeed, a quick start-up requires the lowest possible ARW parameter. However, during the start-up stage, the carrier 12 is stopped and has few mechanical vibrations. As such, it is not necessary to adapt the bandwidth of the measuring device 2 to offset the vibrations of the carrier 12, which allows the application, in the NMR gyroscope 4, of a static magnetic field having a low amplitude, which results in a low ARW parameter.

The detection of the fact that the present stage is the navigation stage allows a constant adjustment of the bandwidth of the measuring device 2. Indeed, during the navigation stage, the carrier 12 is in motion and has mechanical vibrations, which has the effect of extending the spectrum of the NMR signals from the NMR gyroscope. Furthermore, the control of the amplitude of the static magnetic field is based on the real-time computation of the bandwidth required, and not on a prior estimation, for example based on the type of carrier and/or on a theoretical and non-real mission profile.

Furthermore, the measuring device 2 requires a time necessary for the alignment stage which is less than the time required for standard devices.

Generally, the vibrations of the carrier 12 are low-frequency vibrations. Consequently, beyond a certain frequency which is of the order of a few hundred Hertz, for example equal to 300 Hz, the amplitude of the vibrations of the carrier 12 is sufficiently low for the impact of the vibrations on the reliability of the rotation measurement to be negligible. As such, by assigning, at a given time, to the present cutoff frequency W the frequency value from which the amplitude of the present spectrum of the MEMS signal is less than or equal to a predetermined threshold, the bandwidth of the measuring device 2 is sufficiently large to account for the effects of the vibrations of the carrier 12, while avoiding applying an excessive magnetic field to the cell 16, which would be liable to degrade the ARW parameter.

What is claimed is:

1. A measuring device for measuring rotation including an NMR gyroscope having a predetermined sensitive axis and a computer, the NMR gyroscope further comprising a generation member configured to generate a magnetic field directed along the sensitive axis,
   the computer being configured to compute, based on an NMR signal output by the NMR gyroscope, a data item relating to a rotation about the sensitive axis,
   wherein the measuring device further comprises a MEMS gyroscope rigidly connected to the NMR gyroscope, the MEMS gyroscope having a sensitive axis merged with the sensitive axis of the NMR gyroscope, and suitable for outputting a MEMS signal representative of a rotation about the sensitive axis,
   the computer being also configured to analyze, over time, the MEMS signal, and to determine a present cutoff frequency equal to a frequency value from which an amplitude of a present spectrum of the MEMS signal is less than or equal to a predetermined threshold,
   the computer being further configured to control the generation member so as to generate, over time, the magnetic field with an amplitude that is dependent on the present cutoff frequency determined by the computer.

2. The measuring device according to claim 1, wherein the NMR gyroscope includes a cell comprising a single gas having a nuclear spin different from zero, the gas having a gyromagnetic ratio, the generation member being configured to generate, over time, the magnetic field with an amplitude that is greater than or equal to a result of a division of the present cutoff frequency by the gyromagnetic ratio of the gas.

3. The measuring device according to claim 1, wherein the NMR gyroscope includes a cell comprising N gases each having a nuclear spin different from zero, N being a natural integer strictly greater than 1, each gas having a specific gyromagnetic ratio, the absolute values of the gyromagnetic ratios being distinct in pairs, the generation member being configured to generate, over time, the magnetic field with an amplitude that is greater than or equal to a maximum among a result of a division of the current cutoff frequency by the smallest of the absolute values of the gyromagnetic ratios, and a result of each division of double the present cutoff frequency by each of the differences between the absolute value of a gyromagnetic ratio and the absolute value of a gyromagnetic ratio which is immediately lower.

4. The measuring device according to claim 3, wherein the cell comprises a first gas and a second gas, the first gas being xenon 131 and the second gas being xenon 129.

5. The measuring device according to claim 1, wherein the computer is configured to detect a present stage among a start-up stage and a navigation stage, the computer being further configured to control, in the case where the present stage is a start-up stage, the generation member so as to generate the magnetic field with a predetermined set-point amplitude.

6. Inertial navigation unit including a first and a second measuring device according to claim 1, the first and the second measuring device having non-parallel sensitive axes.

7. Inertial navigation unit including a first, a second and a third measuring device according claim 1, the first and the second measuring device having non-parallel sensitive axes and the third measuring device having a sensitive axis non-parallel to each of the sensitive axes of the first and the second measuring device.

8. A method for measuring rotation including computing of a data item relating to a rotation about a predetermined sensitive axis, based on an NMR signal output by an NMR gyroscope having the predetermined sensitive axis and comprising a generation member configured to generate a magnetic field directed along the sensitive axis,
   wherein the method further includes steps for:
   analyzing, over time, a MEMS signal emitted by a MEMS gyroscope rigidly connected to the NMR gyroscope and having a sensitive axis merged with the sensitive axis of the NMR gyroscope, the MEMS signal being representative of a rotation about the sensitive axis, and determining a present cutoff frequency equal to the frequency value from which the amplitude of a present spectrum of the MEMS signal is less than or equal to a predetermined threshold;
   commanding the generation member of the NMR gyroscope to generate, over time, the magnetic field with an amplitude that is dependent on the present cutoff frequency.

9. The method according to claim 8, further including steps for:
   detecting a present stage among a start-up stage and a navigation stage;
   in the case where the present stage is a start-up stage, commanding the generation member to generate the magnetic field with a predetermined set-point amplitude.

10. Computer program product comprising program code instructions which, when run by a computer, implement the method according to claim 8.

* * * * *

UNITED STATES PATENT AND TRADEMARK OFFICE
CERTIFICATE OF CORRECTION

PATENT NO. : 10,690,501 B2
APPLICATION NO. : 16/089688
DATED : June 23, 2020
INVENTOR(S) : Augustin Palacios Laloy et al.

Page 1 of 1

It is certified that error appears in the above-identified patent and that said Letters Patent is hereby corrected as shown below:

In the Specification

Column 5, Line 30, "gyromagnetic ration $\gamma$." should be --gyromagnetic ration $\gamma_1$.--.

Signed and Sealed this
Nineteenth Day of January, 2021

Andrei Iancu
*Director of the United States Patent and Trademark Office*